US006881763B2

(12) United States Patent
Kurth

(10) Patent No.: US 6,881,763 B2
(45) Date of Patent: Apr. 19, 2005

(54) PLASTIC MATERIAL

(75) Inventor: Thomas M. Kurth, Princeton, IL (US)

(73) Assignee: Urethane Soy Systems Company, Volga, SD (US)

( * ) Notice: Subject to any disclaimer, the term of this patent is extended or adjusted under 35 U.S.C. 154(b) by 0 days.

(21) Appl. No.: 10/639,109

(22) Filed: Aug. 12, 2003

(65) Prior Publication Data
US 2004/0034163 A1 Feb. 19, 2004

Related U.S. Application Data

(60) Division of application No. 10/253,252, filed on Sep. 24, 2002, now Pat. No. 6,624,244, which is a continuation of application No. 09/646,356, filed as application No. PCT/US99/21511 on Sep. 17, 1999, now Pat. No. 6,465,569, which is a continuation-in-part of application No. 09/154,340, filed on Sep. 17, 1998, now Pat. No. 6,180,686.

(51) Int. Cl.$^7$ .............................. C08J 9/34; C08L 75/00; C08H 5/00; C08G 18/00; C08G 18/60
(52) U.S. Cl. ...................... 521/51; 521/84.1; 521/109.1; 521/137; 521/151; 521/155; 528/65; 528/74.5
(58) Field of Search ....................... 521/51, 84.1, 109.1, 521/137, 151, 155; 528/65, 74.5

(56) References Cited

U.S. PATENT DOCUMENTS

| 1,447,954 | A | 3/1923 | Webster |
| 2,167,266 | A | 7/1939 | Kimball |
| 2,556,336 | A | 6/1951 | Nye |
| 2,569,206 | A | 9/1951 | Vogel |
| 2,606,890 | A | 8/1952 | Polly et al. |
| 2,745,855 | A | 5/1956 | Case |
| 2,787,601 | A | 4/1957 | Detrick et al. |
| 2,833,730 | A | 5/1958 | Barthel |
| 3,001,958 | A | 9/1961 | Schwarcman |
| 3,396,473 | A | 8/1968 | Turner |
| 3,535,156 | A | 10/1970 | Turner |
| 3,576,929 | A | 4/1971 | Turner et al. |
| 3,639,312 | A | 2/1972 | Turner |
| 3,755,212 | A | 8/1973 | Dunlap et al. |
| 3,778,205 | A | 12/1973 | Turner et al. |
| 3,821,130 | A | 6/1974 | Barron et al. |
| 3,846,478 | A | 11/1974 | Cummins |
| 3,862,879 | A | 1/1975 | Barron et al. |
| 3,963,699 | A | 6/1976 | Rizzi et al. |
| 3,985,814 | A | 10/1976 | Dougherty |
| 3,991,126 | A | 11/1976 | Bacskai |
| 4,005,035 | A | 1/1977 | Deaver |
| 4,022,941 | A | 5/1977 | Prokai et al. |
| 4,045,498 | A | 8/1977 | Deno |
| 4,076,679 | A | 2/1978 | Turner |
| 4,116,987 | A | 9/1978 | Deno |
| 4,171,395 | A | 10/1979 | Tillotson |
| 4,185,146 | A | 1/1980 | Burke |
| 4,246,363 | A | 1/1981 | Turner et al. |
| 4,264,743 | A | 4/1981 | Maruyama et al. |
| 4,278,482 | A | 7/1981 | Poteet et al. |
| 4,286,003 | A | 8/1981 | Higgins et al. |
| 4,296,159 | A | 10/1981 | Jenkines et al. |
| 4,314,088 | A | 2/1982 | Austin et al. |
| 4,334,061 | A | 6/1982 | Bossier, III |
| 4,354,810 | A | 10/1982 | Stidham |
| 4,359,359 | A | * 11/1982 | Gerlach et al. ............. 156/294 |
| 4,375,521 | A | 3/1983 | Arnold |
| 4,376,171 | A | 3/1983 | Blount |
| 4,390,739 | A | 6/1983 | Michaelson et al. |
| 4,393,253 | A | 7/1983 | Michaelson et al. |
| 4,405,393 | A | 9/1983 | Tillotson |
| 4,483,894 | A | 11/1984 | Porter et al. |
| 4,496,547 | A | 1/1985 | Kawashima et al. |
| 4,496,778 | A | 1/1985 | Myers et al. |
| 4,496,779 | A | 1/1985 | Myers et al. |
| 4,512,831 | A | 4/1985 | Tillotson |
| 4,515,646 | A | 5/1985 | Walker et al. |
| 4,518,772 | A | 5/1985 | Volpenhein |
| 4,530,941 | A | 7/1985 | Turner et al. |
| 4,582,891 | A | * 4/1986 | Maki et al. ................ 528/74.5 |
| 4,585,804 | A | 4/1986 | Lancaster et al. |
| 4,595,436 | A | 6/1986 | Walker et al. |
| 4,611,044 | A | 9/1986 | Meyer et al. |

(Continued)

FOREIGN PATENT DOCUMENTS

| AU | 704532 | 3/1997 |
| DE | 19643816 | 5/1998 |
| DE | 3702615 | 11/2000 |
| DE | 4332292 | 11/2001 |
| JP | 05186556 | 7/1993 |
| WO | 9707150 | 2/1997 |
| WO | 9807777 | 2/1998 |
| WO | 0015684 | 3/2000 |
| WO | 0023491 | 4/2000 |
| WO | 0104225 | 1/2001 |
| WO | 0170842 | 9/2001 |
| WO | 9912987 | 9/2001 |

OTHER PUBLICATIONS

Modern Plastics Encyclopedia, vol. 45: No. 14A, pp 100–101, 113, 352, 354, 356, 358–360, Oct. 1968.

Handbook of Chemistry and Physics, 1973–1974, Robert C. Weast, Ph.D.

(Continued)

Primary Examiner—Nathan M. Nutter
(74) Attorney, Agent, or Firm—Price, Heneveld, Cooper, Dewitt & Litton, LLP

(57) ABSTRACT

A material comprising the reaction product of an A-side having an isocyanate and a B-side having a cross-linker comprising a multifunctional alcohol, a vegetable oil, preferably a blown/oxidized vegetable oil, most preferably a blown/oxidized soybean oil, and a catalyst, wherein the vegetable oil and the cross-linking agent are substantially non-esterified prior to reacting/combining the A-side with the B-side and the method of producing the same.

4 Claims, No Drawings

U.S. PATENT DOCUMENTS

| | | |
|---|---|---|
| 4,642,320 A | 2/1987 | Turner et al. |
| 4,657,790 A | 4/1987 | Wing et al. |
| 4,686,242 A | 8/1987 | Turner et al. |
| 4,687,788 A | 8/1987 | Hillshafer et al. |
| 4,696,849 A | 9/1987 | Mobley et al. |
| 4,701,475 A | 10/1987 | Turner |
| 4,734,455 A | 3/1988 | Mobley et al. |
| 4,740,367 A | 4/1988 | Force et al. |
| 4,745,135 A | 5/1988 | Thomas et al. |
| 4,745,136 A | 5/1988 | Thomas et al. |
| 4,745,137 A | 5/1988 | Thomas et al. |
| 4,798,849 A | 1/1989 | Thomas et al. |
| 4,806,632 A | 2/1989 | McCoy et al. |
| 4,825,004 A | 4/1989 | Rutzen et al. |
| 4,843,138 A | 6/1989 | Tazewell et al. |
| 4,853,054 A | 8/1989 | Turner et al. |
| 4,853,280 A | 8/1989 | Poteet |
| 4,861,803 A | 8/1989 | Turner |
| 4,913,958 A | 4/1990 | Skaggs et al. |
| 4,931,552 A | 6/1990 | Gibson et al. |
| 4,942,278 A | 7/1990 | Sheinberg et al. |
| 4,943,626 A | 7/1990 | McGrath et al. |
| 4,952,687 A | 8/1990 | Bodor et al. |
| 4,968,791 A | 11/1990 | Van Der Plank |
| 4,973,681 A | 11/1990 | Watanabe |
| 4,980,388 A | 12/1990 | Herrington et al. |
| 5,010,117 A | 4/1991 | Herrington et al. |
| 5,021,256 A | 6/1991 | Guffey et al. |
| 5,032,622 A | 7/1991 | Herrington et al. |
| 5,043,438 A | 8/1991 | Buter |
| 5,071,975 A | 12/1991 | Ver Der Plank et al. |
| 5,104,693 A | 4/1992 | Jenkines |
| 5,104,910 A | 4/1992 | Turner et al. |
| 5,106,874 A | 4/1992 | Porter et al. |
| 5,106,884 A | 4/1992 | Turner et al. |
| 5,106,967 A | 4/1992 | Mazur |
| 5,126,494 A | 6/1992 | Gilheany et al. |
| 5,194,281 A | 3/1993 | Johnston et al. |
| 5,225,049 A | 7/1993 | Barmentlo et al. |
| 5,231,199 A | 7/1993 | Willemse |
| 5,274,145 A | 12/1993 | Gubelmann |
| 5,324,846 A | 6/1994 | Hirshman et al. |
| 5,397,810 A | 3/1995 | Ozaki et al. |
| 5,440,027 A | 8/1995 | Hasenhuettl |
| 5,447,963 A | 9/1995 | Pcolinsky et al. |
| 5,482,980 A | 1/1996 | Pcolinsky |
| 5,491,174 A | 2/1996 | Grier et al. |
| 5,491,226 A | 2/1996 | Kenneally |
| 5,496,869 A | 3/1996 | Williams et al. |
| 5,504,202 A | 4/1996 | Hutchison |
| 5,571,935 A | 11/1996 | Sekula et al. |
| 5,576,027 A | 11/1996 | Friedman et al. |
| 5,627,221 A | 5/1997 | Schumacher et al. |
| 5,629,434 A | 5/1997 | Cusumano et al. |
| 5,648,483 A | 7/1997 | Granberg et al. |
| 5,681,948 A | 10/1997 | Miller et al. |
| 5,698,722 A | 12/1997 | Cusumano et al. |
| 5,710,190 A | 1/1998 | Jane et al. |
| 5,756,195 A | 5/1998 | Allen et al. |
| 5,766,704 A | 6/1998 | Allen et al. |
| 5,767,257 A | 6/1998 | Schafermeyer et al. |
| 5,795,949 A | 8/1998 | Daute et al. |
| 5,811,129 A | 9/1998 | Friedman et al. |
| 5,869,546 A | 2/1999 | Gruss et al. |
| 5,900,496 A | 5/1999 | Hou |
| 5,908,701 A | 6/1999 | Jennings et al. |
| 5,922,779 A | 7/1999 | Hickey |
| 5,945,529 A | 8/1999 | Corrigan et al. |
| 6,015,440 A | 1/2000 | Noureddini |
| 6,080,853 A | 6/2000 | Corrigan et al. |
| 6,096,401 A | 8/2000 | Jenkines |
| 6,107,433 A | 8/2000 | Petrovic et al. |
| 6,121,398 A | 9/2000 | Wool et al. |
| 6,133,329 A | 10/2000 | Shieh et al. |
| 6,174,501 B1 | 1/2001 | Noureddini |
| 6,180,686 B1 * | 1/2001 | Kurth .......................... 521/51 |
| 6,288,133 B1 | 9/2001 | Haquist |
| 6,388,002 B1 | 5/2002 | Baker et al. |
| 6,420,446 B1 | 7/2002 | Chang |
| 6,465,569 B1 | 10/2002 | Kurth |
| 6,624,244 B1 | 9/2003 | Kurth |
| 6,649,667 B1 | 11/2003 | Clatty |

OTHER PUBLICATIONS

Encyclopedia of Food Technology, vol. 2, 1974, p. 818–828, Arnold H. Johnson, Ph.D. and Martin S. Peterson, Ph.D.

"Renewable Raw Materials–An Important Basis for Urethane Chemistry," Urethane Technology, vol. 14, No. 2, Apr./May 1997, Crain Communications 1997.

"Morphology of Water–Brown Flexible Polyurethane Foams, "Armisted et al., Journal of Applied Polymer Science, vol. 35, pp. 601–629, 1988.

"Model/MDI/Butendiol Polyurethanes : Molecular Structure Morphology, Physical and Mechanical Properties," Christenson et al., Journal of Polymer Science; Part B: Polymer Physics, vol. 24, pp. 1401–1439, 1986.

"Chemoenzymatic Synthesis of Urethane Oil Based on Special Functional Group Oil Based on Special Functional Group Oil," M. D. Bhabhe and V. D. Athawate, Journal of Applied Polymer Sciene, vol. 69, 1451–1458 (1998).

Nakamura et al., Kobunshi Ronbunshu, Preparation of Polyurethane Foam From Waste Vegetable Oil, 50 (11), pp. 881–886, (1993).

Colvin et al., UTECH Asia, Low Cost Polyols from Natural Oils, paper 36, 1995.

* cited by examiner

PLASTIC MATERIAL

CROSS-REFERENCE TO RELATED APPLICATIONS

This application is a division of and claims the benefit of U.S. patent application Ser. No. 10/253,252, filed on Sep. 24, 2002, and now U.S. Pat. No. 6,624,244 which is a continuation of U.S. Pat. No. 6,465,569, application Ser. No. 09/646,356 filed on Sep. 14, 2000 which is based upon and claims the benefit of PCT Application No. PCT/US99/21511 WO 00/15684, filed on Sep. 17, 1999, which is a continuation-in-part and claims the benefit of U.S. patent application Ser. No. 09/154,340 filed on Sep. 17, 1998, which has now issued as U.S. Pat. No. 6,180,686.

BACKGROUND OF THE INVENTION

Because of their widely ranging mechanical properties and their ability to be relatively easily machined and formed, plastic foams and elastomers have found wide use in a multitude of industrial and consumer applications. In particular, urethane foams and elastomers have been found to be well suited for many applications. Automobiles, for instance, contain a number of components, such as cabin interior parts, that are comprised of urethane foams and elastomers. Such urethane foams are typically categorized as flexible, semi-rigid, or rigid foams with flexible foams generally being softer, less dense, more pliable, and more subject to structural rebound subsequent to loading than rigid foams.

The production of urethane foams and elastomers are well known in the art. Urethanes are formed when isocyanate (NCO) groups react with hydroxyl (OH) groups. The most common method of urethane production is via the reaction of a polyol and an isocyanate which forms the backbone urethane group. A cross-linking agent may also be added. Depending on the desired qualities of the final urethane product, the precise formulation may be varied. Variables in the formulation include the type and amounts of each of the reactants.

In the case of a urethane foam, a blowing agent is added to cause gas or vapor to be evolved during the reaction. The blowing agent creates the void cells in the final foam, and commonly is a solvent with a relatively low boiling point or water. A low boiling solvent evaporates as heat is produced during the exothermic isocyanate/polyol reaction to form vapor bubbles. If water is used as a blowing agent, a reaction occurs between the water and the isocyanate group to form an amine and carbon dioxide ($CO_2$) gas in the form of bubbles. In either case, as the reaction proceeds and the material solidifies, the vapor or gas bubbles are locked into place to form void cells. Final urethane foam density and rigidity may be controlled by varying the amount or type of blowing agent used.

A cross-linking agent is often used to promote chemical cross-linking to result in a structured final urethane product. The particular type and amount of cross-linking agent used will determine final urethane properties such as elongation, tensile strength, tightness of cell structure, tear resistance, and hardness. Generally, the degree of cross-linking that occurs correlates to the flexibility of the final foam product. Relatively low molecular weight compounds with greater than single functionality are found to be useful as cross-linking agents.

Catalysts may also be added to control reaction times and to effect final product qualities. The effects of catalysts generally include the speed of the reaction. In this respect, the catalyst interplays with the blowing agent to effect the final product density. The reaction should proceed at a rate such that maximum gas or vapor evolution coincides with the hardening of the reaction mass. Also, the effect of a catalyst may include a faster curing time so that a urethane foam may be produced in a matter of minutes instead of hours.

Polyols used in the production of urethanes are petrochemicals. Polyester polyols and polyether polyols being the most common polyols used in urethanes production. For rigid foams, polyester or polyether polyols with molecular weights greater than 6,000, are generally used. For semi-rigid foams, polyester or polyether polyols with molecular weights of 3,000 to 6,000 are generally used, while for flexible foams, shorter chain polyols with molecular weight of 600 to 4,000 are generally used. There is a very wide variety of polyester and polyether polyols available for use, with particular polyols being used to engineer and produce a particular urethane elastomer or foam having desired particular final toughness, durability, density, flexibility, compression set ratios and modulus, and hardness qualities. Generally, higher molecular weight polyols and lower functionality polyols tend to produce more flexible foams than do lighter polyols and higher functionality polyols. In order to eliminate the need to produce, store, and use different polyols, it would be advantageous to have a single versatile component that was capable of being used to create final urethane foams of widely varying qualities.

Further, use of petrochemicals such as polyester or polyether polyols is disadvantageous for a variety of reasons. As petrochemicals are ultimately derived from petroleum, they are a non-renewable resource. The production of a polyol requires a great deal of energy, as oil must be drilled, extracted from the ground, transported to refineries, refined, and otherwise processed to yield the polyol. These required efforts add to the cost of polyols and to the disadvantageous environmental effects of its production. Also, the price of polyols tends to be somewhat unpredictable as it tends to fluctuate based on the fluctuating price of petroleum.

Also, as the consuming public becomes more aware of environmental issues, there are distinct marketing disadvantages to petrochemical-based products. Consumer demand for "greener" products continues to grow. As a result, it would be most advantageous to replace polyester or polyether polyols, as used in the production of urethane elastomers and foams, with a more versatile, renewable, less costly, and more environmentally friendly component.

Efforts have been made to accomplish this. Plastics and foams made using fatty acid triglycerides derived from vegetables have been developed, including soybeans derivatives. Because soybeans are a renewable, relatively inexpensive, versatile, and environmentally friendly, they are desirable as ingredients for plastics manufacture. Soybeans may be processed to yield fatty acid triglyceride rich soy oil and protein rich soy flour.

Unlike urethanes, many plastics are protein based. For these types of plastics, soy protein based formulations have been developed. U.S. Pat. No. 5,710,190, for instance, discloses the use of soy protein in the preparation of a thermoplastic foam. Such plastics, however, are not suitable for use in applications that call for the particular properties of urethanes. Since urethanes don't utilize proteins in their formulations, soy proteins are not relevant to the manufacture of urethanes.

Epoxidized soy oils, in combination with polyols, have also been used to formulate plastics and plastic foams, including urethanes. For example, U.S. Pat. No. 5,482,980 teaches using an epoxidized soy oil in combination with a polyol to produce a urethane foam. A polyester or polyether polyol remains in the formulation, however. Also, as the epoxidation processing of the soy oil requires energy, material and time, use of an unmodified soy oil would be more advantageous.

Efforts have been made to produce a urethane type cellular plastic from unmodified soy oil. U.S. Pat. Nos. 2,787,601 and 2,833,730 disclose a rigid cellular plastic material that may be prepared using any of several vegetable oils, including soy oil as a prepolymer component only. The foam disclosed in these patents is made from a multistep process requiring the initial preparation of a prepolymer. Moreover, in the case of U.S. Pat. No. 2,833,730, relatively low cross-linker concentrations are urged, resulting in questionable product stability. Further, use of a particular isocyanate, namely toluene diisocyanate, is disclosed, which is disadvantageous due to its relatively high toxicity.

An unresolved need therefore exists in industry for a urethane elastomer, a urethane foam, and a method of producing such materials that are based on a reaction between isocyanates alone or as a prepolymer, in combination with, a vegetable oil or a vegetable oil-polyurea polyol blend, are particularly desirable because they are relatively inexpensive, versatile, renewable, environmentally friendly material such as vegetable oils as a replacement for polyether or polyester polyols typically employed.

SUMMARY OF THE INVENTION

One embodiment of the present invention includes a material that includes the reaction product of an A-side including an isocyanate, preferably a diisocyanate, and a B-side including a vegetable oil, a cross-linking agent having a multi-functional alcohol, and a catalyst that is substantially non-esterified.

Yet another embodiment of the present invention further includes a method for preparing a material comprising the steps of combining an A-side including an isocyanate, preferably a diisocyanate, and a B-side including a vegetable oil, a cross-linking agent having a multi-functional alcohol, and a catalyst that is substantially non-esterified.

These and other features, advantages and objects of the present invention will be further understood and appreciated by those skilled in the art by reference to the following specification and claims.

DETAILED DESCRIPTION OF THE PREFERRED EMBODIMENT

The preparation of urethanes is well known in the art. They are generally produced by the reaction of petrochemical polyols, either polyester or polyether, with isocyanates. The flexibility or rigidity of the foam is dependent on the molecular weight and functionality of the polyol and isocyanate used.

Petrochemical polyol-based polyurethanes can be prepared in a one step or a two step process. In the one step process, what is known in the art as an A-side reactant is combined with what is known as a B-side reactant. The A-side is generally considered to comprise an isocyanate or a mixture of diisocyanate. The diisocyanates typically used are diphenylmethane diisocyanate (MDI) or toluylenediisocyanate (TDI). The particular isocyanate chosen will depend on the particular final qualities desired in the urethane.

The B-side material is generally a solution of a petroleum-based polyester or polyether polyol, cross-linking agent, and blowing agent. A catalyst is also generally added to the B-side to control reaction speed and effect final product qualities. As discussed infra, the use of a petrochemical such as a polyester or polyether polyol is undesirable for a number of reasons.

It has been discovered, however, that flexible urethane foams of a high quality can be prepared by substituting the petroleum-based polyol in the B-side preparation with a vegetable oil in the presence of a multi-functional alcohol cross-linking agent. The molar ratio of the hydroxyl (OH) groups of the cross-linking agent hydroxyl (OH) groups to the vegetable oil is preferably at least 0.7:1, and most preferably between about 0.7 and 1.2:1. The replacement is made on a substantially 1:1 weight ratio of vegetable oil for replaced petroleum-based polyol. Alternatively, a blend of petroleum-based polyol and vegetable oil may be used. The process of producing the urethane does not change significantly with the petroleum-based polyol replaced by the vegetable oil with all other components and general methods as are generally known in the art. The qualities of the final flexible, semi-rigid, or rigid urethane foam produced using the vegetable oil are consistent with those produced using a high grade, expensive polyol.

Further, using a single vegetable oil, urethane foams of varying and selectable final qualities, including differing flexibility, density, and hardness, can be made by varying only the primary reactants. It would be difficult, if not impossible, to create such varied final foams using a single petroleum-based polyester or polyether polyol with the same variations in the remaining reactants. Instead, different petroleum-based polyols would be required to produce such varied results.

The use of vegetable oil in the urethane forming reaction also realizes a significant cost savings. Vegetable oils are abundant, renewable, and easily processed commodities, as opposed to polyols, which petroleum derivatives and which entail significant associated processing costs. As such, they may currently be acquired for a cost of approximately half that of average grade petroleum-based polyurea, polyester or polyether polyols, and approximately one quarter the cost of high grade petroleum-based polyester or polyether polyols. Also, as polyols derived from petroleum, they are not renewable and carry a certain environmental cost with them. There is a distinct marketing advantage to marketing products that are based on environmentally friendly, renewable resources such as vegetable oils.

The A-side isocyanate reactant of the urethane of the invention is preferably comprised of an isocyanate chosen from a number of suitable isocyanates as are generally known in the art. Different isocyanates may be selected to create different properties in the final product. The A-side reactant of the urethane of the invention comprises diisocyanate; 4,4' diphenylmethane diisocyanate; 2,4-diphenylmethane diisocyanate; and modified diphenylmethane diisocyanate. Preferably, a modified diphenylmethane diisocyanate is used. It should be understood that mixtures of different isocyanates may also be used.

The A-side of the reaction may also be a prepolymer isocyanate. The prepolymer isocyanate is typically the reaction product of an isocyanate, preferably a diisocyanate, and most preferably some form of diphenylmethane diisocyanate and a vegetable oil. The vegetable oil can be soy oil, rapeseed oil, cottonseed oil, or palm oil, or any other oil having a suitable number of reactive hydroxyl (OH) groups.

The most preferred vegetable oil is soy oil. To create the prepolymer diisocyanate, the vegetable oil and isocyanate are mixed in a 1:1 ratio for 10–15 seconds every 10–15 minutes for a total of 4 hours or until the reaction has ended. There will still be unreacted isocyanate (NCO) groups in the prepolymer. However, the total amount of active A-side material has increased through this process. The prepolymer reaction reduces the cost of the A-side component by decreasing the amount of isocyanate required and utilizes a greater amount of inexpensive, environmentally friendly soy oil. In order to permit the prepolymer diisocyanate A-side to react with the B-side, additional isocyanate must be added to elevate the isocyanate (NCO) level to an acceptable level.

The B-side reactant of the urethane reaction includes at least vegetable oil and a cross-linking agent. Typically, a blowing agent and a catalyst are also included in the B-side. It is believed that the isocyanate reacts with the fatty acids of the vegetable oil to produce the polymeric backbone of the urethane.

The vegetable oils that are suitable for use tend to be those that are relatively high in triglyceride concentration and that are available at a relatively low cost. The preferred vegetable oil is soy oil, although it is contemplated that other vegetable oils, such as rapeseed oil (also known as canola oil), cottonseed oil, and palm oil can be used in accordance with the present invention. Except for the preliminary blowing step where air is passed through the oil to remove impurities and to thicken it, the soy oil is otherwise unmodified. It does not require esterification as is required for some urethane products of the prior art. The preferred blown soy oil has the following composition:

| 100% Pure Soybean Oil Air Oxidized | |
| --- | --- |
| Moisture | 1.15% |
| Free Fatty Acid | 5.92% as OLEIC |
| Phosphorous | 55.5 ppm |
| Peroxide Value | 137.22 Meq/Kg |
| Iron | 6.5 ppm |
| Hydroxyl Number | 212 mg KOH/g |
| Acid Value | 12.46 mg KOH/g |
| Sulfur | 200 ppm |
| Tin | <.5 ppm |

Except for the use of the preferred unmodified, blown soy oil replacing the polyol, the preferred B-side reactants used to produce the foam of the invention are generally known in the art. Accordingly, preferred blowing agents for the invention are those that are likewise known in the art and may be chosen from the group comprising 134A HCFC, a hydrochloroflurocarbon refrigerant available from Dow Chemical Co., Midland Mich.; methyl isobutyl ketone (MIBK); acetone; a hydroflurocarbon; and methylene chloride. These preferred blowing agents create vapor bubbles in the reacting mass. Should other blowing agents be used that react chemically, such as water reacting with the isocyanate (NCO) groups, to produce a gaseous product, concentrations of other reactants may be adjusted to accommodate the reaction.

The cross-linking agents of the foam of the present invention are also those that are well known in the art. They must be at least di-functional (a diol). The preferred cross-linking agents for the foam of the invention are ethylene glycol and 1,4 butanediol; however, other diols may be used. It has been found that a mixture of ethylene glycol and 1,4 butanediol is particularly advantageous in the practice of the present invention. Ethylene glycol tends to offer a shorter chain molecular structure with many "dead end" sites, tending to create a firmer final foam resistant to tearing or "unzipping," while 1,4 butanediol offers a longer chain molecular structure, tending to create a softer foam. Proper mixture of the two can create engineered foams of almost any desired structural characteristics.

In addition to the B-side's soy oil and blowing agent, one or more catalyst may be present. The preferred catalysts for the urethanes of the present invention are those that are generally known in the art and are most preferably tertiary amines chosen from the group comprising DABCO 33-LV® comprised of 33% 1,4 diaza-bicyclco-octane (triethylenediamine) and 67% dipropylene glycol, a gel catalyst available from the Air Products Corporation; DABCO® BL-22 blowing catalyst available from the Air Products Corporation; and POLYCAT® 41 trimerization catalyst available from the Air Products Corporation.

Also as known in the art, the B-side reactant may further comprise a silicone surfactant which functions to influence liquid surface tension and thereby influence the size of the bubbles formed and ultimately the size of the hardened void cells in the final foam product. This can effect foam density and foam rebound (index of elasticity of foam). Also, the surfactant may function as a cell opening agent to cause larger cells to be formed in the foam. This results in uniform foam density, increased rebound, and a softer foam.

A molecular sieve may further be present to absorb excess water from the reaction mixture. The preferred molecular sieve of the present invention is available under the trade name L-paste™.

The flexible and semi-rigid foams of the invention will have greater than approximately 60% open cells. The preferred flexible foam of the invention will also have a density of from 1 lb. to 45 lb. per cubic foot and a hardness of durometer between 20 and 70 Shore "A."

The urethane foam of the present invention is produced by combining the A-side reactant with the B-side reactant in the same manner as is generally known in the art. Advantageously, use of the vegetable oil to replace the petroleum-based polyol does not require significant changes in the method of performing the reaction procedure. Upon combination of the A and B side reactants, an exothermic reaction ensues that may reach completion in anywhere from several minutes to several hours depending on the particular reactants and concentrations used. Typically, the reaction is carried out in a mold so that the foam expands to fill the mold, thereby creating a final foam product in the shape of the mold.

The components may be combined in differing amounts to yield differing results, as will be shown in the Examples presented in the detailed description below. Generally, however, the preferred flexible foam of the invention B-side mixture, when using the preferred components, is prepared with the following general weight ratios:

| | |
| --- | --- |
| Blown soy oil | 100 parts |
| Cross-linking agent | 8–15 parts |
| Blowing agent | 8–15 parts |
| Catalyst | 1–12 parts |

A petroleum based polyol such as polyether polyol, polyester polyol, or polyurea polyol may be substituted for some of the blown soy oil in the B-side of the reaction, however, this is not necessary. This preferred B-side formulation is then combined with the A-side to produce a foam. The preferred A-side, as discussed previously, is comprised of MDI or a prepolymer comprised of MDI and a vegetable oil, preferably soy oil. The A-side and B-side are typically, and preferably in an approximate ratio of about 35 parts to about 85 parts A-side to 100 parts B-side.

Flexible urethane foams may be produced with differing final qualities using the same vegetable oil by varying the particular other reactants chosen. For instance, it is expected that the use of relatively high molecular weight and high functionality isocyanates will result in a less flexible foam than will use of a lower molecular weight and lower functionality isocyanate when used with the same vegetable oil. Similarly, it is expected that lower molecular weight and lower functionality cross-linkers will result in a more flexible foam than will higher molecular weight and higher functionality cross-linkers when used with the same vegetable oil. Also, a ethylene glycol cross-linker will result in shorter final chains and a firmer foam, while use of a butanediol cross-linker results in longer chains and a softer foam. Moreover, it has been contemplated that chain extenders may also be employed in the present invention. Butanediol, in addition to acting as a cross-linker, may act as a chain extender.

Urethane elastomers can be produced in much the same manner as urethane foams, except that a blowing agent is not present to create void cells in the material. It has been discovered that useful urethane elastomers may be prepared using a vegetable oil to replace a petroleum-based polyester or polyether polyol. The preferred elastomer of the invention is produced using diphenylmethane diisocyanate (MDI); 1,4 butanediol cross-linking agent; and a vegetable oil, preferably soy oil. A catalyst may be added to the reaction composition to decelerate the speed of the reaction. The preferred elastomer of the invention is prepared by combining the reactants. An exothermic reaction occurs that creates the elastomer. The preferred elastomer has an approximate density of 65 lb. to 75 lb. per cubic foot.

The following examples of preparation of foams and elastomers of the invention summarized in Table A will illustrate various embodiments of the invention. In the Examples, the B-Side (soy oil and other components), once blended, has a shelf life of several months. The A-side material in the following examples is comprised of modified diphenylmethane diisocyanate (MDI). The prepolymer A-side material in the following examples is the reaction product of a vegetable oil, preferably soy oil, and a modified diphenylmethane diisocyanate (MDI). There are four different MDI materials specified in the following examples; all are modified monomeric or polymeric diphenylmethane diisocyanates available from the Bayer Corp., Polymers Division, Rosemont Ill.: "Mondur® MA-2901" (Bayer Product Code No. C-1464); "Mondur®-448" (Bayer Product Code No. G-448), "Mondur® MRS-20", and "Mondur®-PF".

Also, "cure" in the following examples refers to the final, cured foam taken from the mold. The soy oil used in the following examples is blown soy oil obtained from Cargill, in Chicago, Ill. Catalysts used include "DABCO 33-LV®," comprised of 33% 1,4-diaza-bicyclo-octane and 67% dipropylene glycol available from the Air Products Urethanes Division; "DABCO® BL-22," a tertiary amine blowing catalyst also available from the Air Products Urethanes Division; and "POLYCAT® 41" (n, n', n", dimethylaminopropyl-hexahydrotriazine tertiary amine) also available from the Air Products Urethanes Division.

Catalysts in the following Examples may be referred to as "front end," "back end," and "blowing". Front end catalysts tend to speed the early portion of the reaction, while back end catalysts tend to speed the later, curing portion of the reaction. A blowing catalyst effects the timing of the activation of the blowing agent. Some of the Examples include "L-paste™," which is a trade name for a molecular sieve for absorbing water. Some also contain "DABCO® DC-5160," a silicone surfactant available from Air Products Urethane Division.

EXAMPLES

Example 1

The B-side material was prepared as follows:

| | |
|---|---|
| 50 g | Soy Oil |
| 5 g | Ethylene Glycol (cross-linker) |
| 1 g | Front end catalyst (DABCO 33-LV ®; 33% triethylenediamine and 67% dipropylene glycol) |
| 1 g | Blow catalyst (DABCO ® BL-22; a tertiary amine catalyst) |
| 4 g | Methyl Isobutyl Ketone (blowing agent) |

Blown soy oil has a molecular weight of about 278, while the ethylene glycol has a molecular weight of about 62. Thus, the molar ratio of ethylene glycol to blown soy oil is 0.22:1. Since the ethylene glycol has two hydroxyl (OH) groups with which to cross-link the constituent fatty acids of the blown soy oil, the molar ratio of the hydroxyl (OH) groups of the ethylene glycol to soy oil is about 0.45:1. The resulting B-side was then combined with an A-side material in a ratio of 50 parts A-side to 100 parts B-side. The A-side material is comprised of Mondur® 448, a modified monomeric diphenylmethane diisocyanate (pMDI). The cure was acceptable; however, the cellular material remained tacky at the surface for 20 minutes.

Example 2

The B-side is the same as that of Example 1. The A-side is comprised of MA-2901, a modified diphenylmethane diisocyanate. The B-side was combined with the A-side in a ratio of 52 parts A-side to 100 parts B-side. The cure was acceptable, although the cellular material remained tacky for 12 minutes.

Example 3

The A-side was the same as Example 2. The B-side was again the same as that of Example 1, except that 1.5 parts of methanol were added as additional blowing agent. The ratio was 52 parts A-side to 100 parts B-side. The sample cured in 1 hour. It was not a favorable result in that the cellular material foamed and then fell back to solid and rose again. The methanol apparently had an adverse affect.

Example 4

| B-side: | 100 g | Soy Oil |
|---|---|---|
| | 5 g | Ethylene Glycol (cross-linker) |
| | 2.5 g | Front end catalyst (DABCO 33-LV ®; 33% 1,4-diaza-bicyclo-octane and 67% dipropylene glycol) |

-continued

| | | |
|---|---|---|
| 2.5 g | Blow catalyst (DABCO ® BL-22; a tertiary amine catalyst) | |
| 4 g | Methyl Isobutyl Ketone (MIBK) | |

The A-side was the same as Example 2. The materials were reacted in a ratio of 50 parts A-side to 100 parts B-side. The results were a good foam, but weak in tensile strength.

Example 5

The B-side and A-side are the same as in Example 4. However, the materials were reacted in a ratio of 52 parts A-side to 100 parts B-side. The results were essentially the same as in Example 4 with a little better tensile strength.

Example 6

| B-Side: | 103 g | Soy Oil |
|---|---|---|
| | 10 g | Ethylene Glycol (cross-linker) |
| | 11 g | Acetone (Blowing agent) |
| | 2.5 g | Front end catalyst (DABCO 33-LV ®; 33% 1,4-diaza-bicyclo-octane and 67% dipropylene glycol) |
| | 2.5 g | Blow catalyst (DABCO ® BL-22; a tertiary amine catalyst) |

The molar ratio of ethylene glycol to blown soy oil is 0.44:1. With two hydroxyl (OH) groups with which to cross-link the constituent fatty acids of the blown soy oil, the molar ratio of the hydroxyl (OH) groups of the ethylene glycol to soy oil is about 0.90:1. The A-side comprises 52 parts MA-2901, a modified monomeric diphenylmethane diisocyanate, to 100 parts B-side. The resulting foam was hard and its cell size large. It fell back to a solid, largely due to too much blowing agent.

Example 7

| B-side: | 100 g | Soy Oil |
|---|---|---|
| | 8 g | Ethylene Glycol (cross-linker) |
| | 5 g | Acetone (Blowing agent) |
| | 2.5 g | Front end catalyst (DABCO 33-LV ®; 33% 1,4-diaza-bicyclo-octane and 67% dipropylene glycol) |
| | 2.5 g | Blow catalyst (DABCO ® BL-22; a tertiary amine catalyst) |

The molar ratio of ethylene glycol to blown soy oil is 0.35 to 1. With two hydroxyl (OH) groups with which to cross-link the constituent fatty acids of the blown soy oil, the molar ratio of the hydroxyl (OH) groups of the ethylene glycol to soy oil is about 0.70:1. The A-side comprises MA-2901, a modified monomeric diphenylmethane diisocyanate, and is present in 51 parts A-side to 100 parts B-side. The resulting foam is generally a good foam, having low tensile strength but a better density range.

Example 8

The B-side is the same as that of Example 7. The A-side also comprises MA-2901, a modified monomeric diphenylmethane diisocyanate, as in Example 7. The A-side is present in a ratio of 45 parts A-side to 100 parts B-side.

Example 9

The A-side and B-side are the same as in Example 7. However, 72 parts A-side were reacted with 100 parts B-side. The resulting foam fell back and did not cure after 1 hour, indicating an overcharge of A-side.

Example 10

| B-side | 100 g | Soy Oil |
|---|---|---|
| | 11 g | Ethylene Glycol (cross-linker) |
| | 4 g | Methyl Isobutyl Ketone (MIBK) |
| | 3 g | Front end catalyst (DABCO 33-LV ®; 33% 1,4-diaza-bicyclo-octane and 67% dipropylene glycol) |
| | 3 g | Blow catalyst (DABCO ® BL-22; a tertiary amine catalyst) |

The molar ratio of ethylene glycol to blown soy oil is 0.49:1. With two hydroxyl (OH) groups with which to cross-link the constituent fatty acids of the blown soy oil, the molar ratio of the hydroxyl (OH) groups of the ethylene glycol to soy oil is about 0.99:1. The A-side comprised MA-2901, a modified monomeric diphenylmethane diisocyanate. The A-side was reacted with the B-side in a ratio of 50 parts A-side to 100 parts B-side. The resulting foam had a 15-minute cure and a very slow recovery. However, the final cure was insufficient because it did not occur for 72 hours.

Example 11

| B-side | 100 g | Soy Oil |
|---|---|---|
| | 11 g | Ethylene Glycol (cross-linker) |
| | 4 g | Methyl Isobutyl Ketone (MIBK) |
| | 3 g | Front end catalyst (DABCO 33-LV ®; 33% 1,4-diaza-bicyclo-octane and 67% dipropylene glycol) |
| | 3 g | Blow catalyst (DABCO ® BL-22; a tertiary amine catalyst) |

The B-side is as in Example 10. The A-side comprises Mondur® 448, a modified monomeric diphenylmethane diisocyanate, in a ratio of 50 parts A-side to 100 parts B-side. The resulting foam cures in 15 minutes, but is very crumbly.

Example 12

| B-side | 100 g | Soy Oil |
|---|---|---|
| | 11 g | Ethylene Glycol (cross-linker) |
| | 4 g | Methyl Isobutyl Ketone (MIBK) |
| | 3 g | front end catalyst (DABCO 33-LV ®; 33% diaza-bicyclo-octane and 67% dipropylene glycol) |
| | 3 g | Blow catalyst (DABCO ® BL-22; a tertiary amine catalyst) |

The B-side is as in Example 10. The A-side comprised 76 parts MA-2901, a modified monomeric diphenylmethane diisocyanate, to 100 parts B-side. The resulting foam cures in 30 minutes, but has a very fast, complete fall back.

Example 13

| B-side | 100 g | Soy Oil |
|---|---|---|
| | 5 g | Ethylene Glycol (cross-linker) |
| | 5 g | 1,4 butanediol (cross-linker) |
| | 4 g | Methyl Isobutyl Ketone (MIBK) |
| | 2.5 g | Front end catalyst (DABCO 33-LV ®; 33% 1,4-diaza-bicyclo-octane and 67% dipropylene glycol) |
| | 2.5 g | Blow catalyst (DABCO ® BL-22; a tertiary amine catalyst) |

Ethylene glycol has a molecular weight of about 62 and 1,4 butanediol has a molecular weight of about 90. Thus, the molar ratio of the ethylene glycol to blown soy oil is 0.22:1 and the molar ratio of the 1,4 butanediol to blown soy oil is 0.15:1. Since each of the ethylene glycol and 1,4 butanediol have two hydroxyl (OH) groups with which to cross-link the constituent fatty acids of the blown soy oil, the molar ratio of the hydroxyl (OH) groups of the 50/50 ethylene glycol/1,4 butanediol cross-linker mixture to the blown soy oil is about 0.75:1. The A-side was reacted at 74 parts MA-2901, a modified monomeric diphenylmethane diisocyanate to 100 parts B-side. The resulting foam cured to the touch within 3 minutes and fully cured within 15 minutes. It has good properties.

Example 14

| B-side | 100 g | Soy Oil |
|---|---|---|
| | 5 g | Ethylene Glycol (cross-linker) |
| | 5 g | 1,4 butanediol (cross-linker) |
| | 4 g | Methyl Isobutyl Ketone (MIBK) |
| | 2.5 g | Front end catalyst (DABCO 33-LV ®; 33% 1,4-diaza-bicyclo-octane and 67% dipropylene glycol) |
| | 2.5 g | Back end catalyst (POLYCAT ® 41; n, n', n", dimethylamino-propyl-hexahydrotriazine tertiary amine) |
| | 2 g | Blow catalyst (DABCO ® BL-22; a tertiary amine catalyst) |

The A-side was reacted at 74 parts, a modified MDI, MA-2901, to 100 parts B-side. The resulting foam cured to the touch within 3 minutes and exhibited slightly better initial strength than the foam of Example 13. It fully cured within 15 minutes with good properties.

Example 15

| B-side | 200 g | Soy Oil |
|---|---|---|
| | 7 g | Ethylene Glycol (cross-linker) |
| | 16 g | 1,4 butanediol (cross linker) |
| | 2.5 g | Front end catalyst (DABCO 33-LV ®; 33% 1,4-diaza-bicyclo-octane and 67% dipropylene glycol) |
| | 2.5 g | Blow catalyst (DABCO ® BL-22' a tertiary amine catalyst) |
| | 2 g | Back end catalyst (POLYCAT ® 41; n, n', n", dimethylamino-propyl-hexahydrotriazine tertiary amine) |

The molar ratio of the ethylene glycol to blown soy oil is 0.15:1 and the molar ratio of the 1,4 butanediol to blown soy oil is 0.24:1. Since each of the ethylene glycol and 1,4 butanediol have two hydroxyl (OH) groups with which to cross-link the constituent fatty acids of the blown soy oil, the molar ratio of the hydroxyl (OH) groups of the 50/50 ethylene glycol/1,4 butanediol cross-linker mixture to blown soy oil is about 0.80:1.

The A-side was reacted at 74 parts, a modified MDI, MA-2901 to 100 parts B-side. The resulting foam had very good qualities. The foam exhibited good elastomeric and fast cure (tack-free after 90 seconds) properties and was soft with good elastomeric properties after 1 hour.

Example 16

The B-side is the same blend as Example 15. The A-side comprises, a modified MDI, Mondur® 448. The A-side was reacted at 74 parts A-side to 100 parts B-side. The reaction time was good and the resulting foam was a stiff flexible foam with good elastomeric properties. The foam continued to exhibit good elastomeric properties after 1 hour.

Example 17

| B-side | 100 g | Soy Oil |
|---|---|---|
| | 5 g | Ethylene Glycol (cross-linker) |
| | 5 g | 1,4 butanediol (cross-linker) |
| | 2.5 g | Front end catalyst (DABCO 33-LV ®; 33% 1,4-diaza-bicyclo-octane and 67% dipropylene glycol) |
| | 2 g | Blow catalyst (DABCO ® BL-22; a tertiary amine catalyst) |
| | 2 g | Back end catalyst (POLYCAT ® 41; n, n', n", dimethylamino-propyl-hexahydrotriazine tertiary amine) |
| | 2 g | Molecular sieve (L-paste ™) |

The molar ratio of the hydroxyl (OH) groups of the 50/50 ethylene glycol/1,4 butanediol cross-linker mixture to soy oil is again about 0.75:1.

The A-side comprises a 50/50 blend of, a modified MDI, MA-2901 and a modified pMDI, Mondur® 448. The A-side was reacted with the B-side at 74 parts A-side to 100 parts B-side. The resulting foam is a good foam with good flexibility, high density, but still needs tensile improvements.

Example 18

| B-side | 200 g | Soy Oil |
|---|---|---|
| | 5 g | Ethylene Glycol (cross-linker) |
| | 21 g | 1,4 butanediol (cross-linker) |
| | 5 g | Front end catalyst (DABCO 33-LV ®; 33% 1,4-diaza-bicyclo-octane and 67% dipropylene glycol) |
| | 5 g | Blow catalyst (DABCO ® BL-22; a tertiary amine catalyst) |
| | 2 g | Back end catalyst (POLYCAT ® 41; n, n', n", dimethylamino-propyl-hexahydrotriazine tertiary amine) |
| | 6 g | Molecular sieve (L-paste ™) |

The molar ratio of the hydroxyl (OH) groups of the 5/21 ethylene glycol/1,4 butanediol mixture to blown soy oil is about 0.85:1.

The A-side comprises a 50/50 blend of a modified MDI, MA-2901 and a modified pMDI, Mondur® 448. The A-side was reacted with the B-side at 74 parts A-side to 100 parts B-side. The resulting foam is very similar to that of Example 17 and is a good foam with good flexibility, high density, but still needs tensile improvements.

Example 19

| B-side | 200 g | Soy Oil |
|---|---|---|
| | 22 g | Ethylene Glycol (cross-linker) |
| | 4 g | 1,4 butanediol (cross-linker) |
| | 2.5 g | Front end catalyst (DABCO 33-LV ®; 33% 1,4-diaza-bicyclo-octane and 67% dipropylene glycol) |
| | 2.5 g | Blow catalyst (DABCO ® BL-22; a tertiary amine catalyst) |
| | 5 g | Back end catalyst (POLYCAT 41 ®; n, n', n", dimethylamino-propyl-hexahydrotriazine tertiary amine) |
| | 16 g | Molecular sieve (L-paste ™) |
| | 4 g | Silicone surfactants (DABCO ® DC-5160) |

The molar ratio of the hydroxyl (OH) groups of the 22/4 ethylene glycol/1,4 butanediol mixture to blown soy oil is about 1.10:1. The A-side comprises a modified MDI, MA-290. The A-side and the B-side were reacted at 74 parts A-side to 100 parts B-side. The resulting foam demonstrated very good properties. It is almost a solid elastomer with good rebound.

Example 20

| B-side | 200 g | Soy Oil |
|---|---|---|
| | 22 g | Ethylene Glycol (cross-linker) |
| | 4 g | 1,4 butanediol (cross-linker) |
| | 10 g | Methylene Chloride (blowing agent) |
| | 2.5 g | Front end catalyst (DABCO 33-LV ®; 33% 1,4-diaza-bicyclo-octane and 67% dipropylene glycol) |
| | 2.5 g | Blow catalyst (DABCO ® BL-22; a tertiary amine catalyst) |
| | 5 g | Back end catalyst (POLYCAT ® 41; n, n', n", dimethylamino-propyl-hexahydrotriazine tertiary amine) |
| | 16 g | Molecular sieve (L-paste ™) |
| | 4 g | Silicone surfactants (DABCO ® DC-5160) |

The molar ratio of the hydroxyl (OH) groups of the 22/4 ethylene glycol/1,4 butanediol mixture to blown soy oil is again about 1.10:1. The A-side comprises a modified MDI, MA-2901, and was reacted at 74 parts A-side to 100 parts B-side. The resulting foam was a very good foam having uniform cell size, good flex, moderate density, good rebound and higher tensile strength.

Example 21

| B-side | 200 g | Soy Oil |
|---|---|---|
| | 22 g | Ethylene Glycol (cross-linker) |
| | 4 g | 1,4 butanediol (cross-linker) |
| | 10 g | Methylene Chloride (blowing agent) |
| | 2.5 g | Front end catalyst (DABCO 33-LV ®; 33% 1,4-diaza-bicyclo-octane and 67% dipropylene glycol) |
| | 2.5 g | Blow catalyst (DABCO ® BL-22; a tertiary amine catalyst) |
| | 5 g | Back end catalyst (POLYCAT 41 ®; n, n', n", dimethylamino-propyl-hexahydrotriazine tertiary amine) |
| | 16 g | Molecular sieve (L-paste ™) |
| | 4 g | Silicone surfactants (DABCO ® DC-5160) |
| | 2 g | Green pigment |

The molar ratio of the hydroxyl (OH) groups of the 22/4 ethylene glycol/1,4 butanediol mixture to blown soy oil is again about 1.10:1. The A-side comprises a modified MDI, MA-2901, and was reacted at 81 parts A-side to 100 parts B-side.

Example 22

| B-side | 200 g | Soy Oil |
|---|---|---|
| | 22 g | Ethylene Glycol (cross-linker) |
| | 4 g | 1,4 butanediol (cross-linker) |
| | 12 g | Methylene Chloride (blowing agent) |
| | 2.5 g | Front end catalyst (DABCO 33-LV ®; 33% 1,4-diaza-bicyclo-octane and 67% dipropylene glycol) |
| | 2.5 g | Blow catalyst (DABCO ® BL-22; a tertiary amine catalyst) |
| | 5 g | Back end catalyst (POLYCAT 41 ®; n, n', n", dimethylamino-propyl-hexahydrotriazine tertiary amine) |
| | 16 g | Molecular sieve (L-paste ™) |
| | 4 g | Silicone surfactants (DABCO ® DC-5160) |
| | 2 g | Green pigment |

The molar ratio of the hydroxyl (OH) groups of the 22/4 ethylene glycol/1,4 butanediol mixture to blown soy oil is again about 1.10:1. The A-side comprises a modified MDI, MA-2901. The A-side and the B-side were reacted at 80 parts A-side to 100 parts B-side. The resulting foam was a good foam. It was a stiffer flexible foam with good cell size, good uniformity, and low to moderate density.

Example 23

| B-side | 400 g | Soy Oil |
|---|---|---|
| | 35 g | Ethylene Glycol (cross-linker) |
| | 15 g | 1,4 butanediol (cross-linker) |
| | 24 g | Methylene Chloride (blowing agent) |
| | 5 g | Front end catalyst (DABCO 33-LV ®; 33% 1,4-diaza-bicyclo-octane and 67% dipropylene glycol) |
| | 5 g | Blow catalyst (DABCO ® BL-22; a tertiary amine catalyst) |
| | 9 g | Back end catalyst (POLYCAT ® 41; n, n', n", dimethylamino-propyl-hexahydrotriazine tertiary amine) |
| | 32 g | Molecular sieve (L-paste ™) |
| | 12.5 g | Silicone surfactants (DABCO ® DC-5160) |
| | 4 g | Green pigment |

The molar ratio of the hydroxyl (OH) groups of the 35/15 ethylene glycol/1,4 butanediol mixture to blown soy oil is about 1.00:1. The A-side comprises a modified MDI, MA-2901, and was reacted at 74 parts A-side to 100 parts B-side. The resulting foam is low in density with poor tensile strength.

Example 24

| B-side | 235 g | Soy Oil |
|---|---|---|
| | 25 g | Ethylene Glycol (cross-linker) |
| | 6 g | 1,4 butanediol (cross-linker) |
| | 12 g | Methylene Chloride (blowing agent) |
| | 2 g | Front end catalyst (DABCO 33-LV ®; 33% 1,4-diaza-bicyclo-octane and 67% dipropylene glycol) |
| | 2 g | Blow catalyst (DABCO ® BL-22; a tertiary amine catalyst) |

| | | |
|---|---|---|
| | 1.75 g | Back end catalyst (POLYCAT 41 ®; n, n', n", dimethylamino-propyl-hexahydrotriazine tertiary amine) |
| | 25 g | Molecular sieve (L-paste ™) |

The molar ratio of the hydroxyl (OH) groups of the 25/6 ethylene glycol/1,4 butanediol mixture to soy oil is about 1.50:1. The A-side comprises a 2,4' rich polymeric MDI, Mondur® MRS-20, and was reacted at 70 parts to 100 parts B-side. The resulting reaction had no foaming and no real reaction.

Example 25

Example 24 is repeated with A-side comprising Mondur®-PF, a modified MDI. Again, no foaming and not a good reaction.

Example 26

Example 24 is again repeated, with the A-side this time comprising a 50/50 mixture of a modified MDI, MA-2901, and a modified pMDI, Mondur® 448. It is reacted at 70 parts to 100 parts B-side.

Example 27

The A-side comprises a modified MDI, MA-2901. The B-side comprises the following:

| | | |
|---|---|---|
| B-side | 100 g | Soy Oil |
| | 7 g | Dipropylene-glycol (cross-linker) |
| | 2 g | Front end catalyst (DABCO 33-LV ®; 33% triethylenediamine and 67% dipropylene glycol) |
| | 2 g | Back end catalyst (DABCO ® 8154; an amine salt) |

The A-side and B-side reactions were mixed in a ratio of 60 parts A-side to 100 parts B-side. The resultant foam exhibited excellent properties.

Example 28

| | | |
|---|---|---|
| B-side | 100 g | Soy Oil |
| | 3 g | Dipropylene glycol (cross-linker) |
| | 2 g | Surfactant |
| | 2 g | Front end catalyst (DABCO 33-LV ®; 33% triethylenediamine and 67% dipropylene glycol) |
| | 2 g | Back end catalyst (DABCO ® 8154; an amine salt) |

The A-side and B-side reactions were mixed in a ratio of 60 parts A-side to 100 parts B-side. The resultant reaction produced a foam exhibiting excellent properties.

Example 29

The A-side and B-side components are identical to those in Example 28. The A-side was reacted with the B-side in a ratio of 68 parts A-side and 100 parts B-side. Once again, the foam produced by the reaction had excellent properties.

Example 30

The A-side comprises a mix of a modified MDI, MA-2901, and a modified pMDI, Mondur® 448. The B-side comprises the following:

| | | |
|---|---|---|
| B-side | 100 g | Soy Oil |
| | 3 g | Tripropylene glycol (cross-linker) |
| | 3 g | Dipropylene glycol (cross-linker) |
| | 2 g | Front end catalyst (DABCO 33-LV ®; 33% triethylenediamine and 67% dipropylene glycol) |
| | 2 g | Back end catalyst (DABCO ® 8154; an amine salt) |

The A-side and B-side were mixed in a ratio of 60 parts A-side to 100 parts B-side. The resultant foam was a rigid foam exhibiting excellent properties.

Example 31

In this example, the A-side was identical to the A-side of Example 30 and the B-side is identical to Example 30 except for the fact that 6% butanediol was added to the B-side. The A-side and B-side were mixed in a ratio of 60 parts A-side to 100 parts B-side. The resultant foam was a rigid foam exhibiting excellent properties. The addition of the butanediol increased the speed of the reaction compared to Example 30.

Example 32

The A-side comprises polymeric MDI. The B-side comprises the following:

| | | |
|---|---|---|
| B-side | 200 g | Soy Oil |
| | 30 g | Ethylene glycol (cross-linker) |
| | 15 g | Butanediol (cross-linker) |
| | 5 g | Aliphatic amine tetrol (CL-485; cross-linker) |
| | 25 g | Molecular sieve (L-paste ™) |
| | 8 g | Front end catalyst (DABCO 33-LV ®; 33% triethylenediamine and 67% dipropylene glycol) |
| | 5 g | Back end catalyst (DABCO ® 1854; an amine salt) |

The A-side and B-side were mixed in a 1:1 ratio. The foam resulting from the chemical reaction was a rigid foam with good properties.

Example 33

| | | |
|---|---|---|
| B-side | 100 g | Soy Oil |
| | 10 g | Butanediol (cross-linker) |
| | 6.4 g | Ethylene glycol (cross-linker) |
| | 3 g | Aliphatic amine tetrol (cross-linker) |
| | 3.2 g | Front end catalyst (DABCO 33-LV ®; 33% triethylenediamine and 67% dipropylene glycol) |
| | 3.0 g | Back end catalyst (DABCO ® 1854; an amine salt) |
| | 5% | Molecular sieve (L-paste ™) |

The A-side and B-side were mixed in a ratio of 35 parts A-side to 100 parts B-side. The resulting foam was very good after about 15 minutes.

Example 34

The A-side comprises either MDI or pMDI. The B-side comprised the following:

| | | |
|---|---|---|
| B-side | 200 g | Soy Oil |
| | 200 g | Polyurea polyol |
| | 48 g | Aliphatic amine tetrol (cross-linker) |
| | 30 g | Ethylene glycol (cross-linker) |
| | 3 g | Front end catalyst (DABCO 33-LV ®; 33% triethylenediamine and 67% dipropylene glycol) |
| | 3 g | Back end catalyst (Polycat 41 ®; n, n', n", dimethylamino-propyl-hexahydrotriazine tertiary amine) |
| | 3 g | Tertiary amine catalyst (DABCO ® BL-22) |
| | 7 g | Molecular sieve (L-paste ™) |

The A-side and B-side were combined in a ratio of 50 parts A-side to 100 parts B-side. The result reaction occurred very fast and the resultant elastomer exhibited good properties. Combining the A-side and the B-side in a ratio of 68 parts A-side to 100 parts B-side also results in an elastomer with good properties.

Example 35

| | | |
|---|---|---|
| B-side | 300 g | Soy Oil |
| | 300 g | Polyurea polyol (petroleum based polyol) |
| | 33 g | Butanediol (cross-linker) |
| | 11.3 g | Front end catalyst (DABCO 33-LV ®; 33% triethylenediamine and 67% dipropylene glycol) |
| | 7.6 g | Back end catalyst (Polycat ® 41; n, n', n", dimethylamino-propyl-hexahydrotriazine tertiary amine |
| | 5 g | Aliphatic amine tetrol (DABCO ® CL-485; cross-linker) |

The A-side was blended with the B-side in a ratio of 40 parts A-side to 100 parts B-side. The resultant foam had good properties, but was slightly hard.

Example 36

The A-side and B-side are identical to Example 35, however, 5% methylene chloride and 1% of a stabilizing anti-oxidant, Stabaxol® were added to the B-side. The A-side and the B-side were mixed in a ratio of 32 parts A-side to 100 parts B-side and a ratio of 36.5 parts A-side to 100 parts B-side. Both resulting foams were good, soft foams. The addition of the methylene chloride as a blowing agent greatly assisted the reaction without pulling out water thereby allowing the foam to stay soft.

Example 37

The A-side comprises a 50/50 mixture of modified MDI and modified pMDI. The B-side comprises the following:

| | | |
|---|---|---|
| B-side | 400 g | Soy Oil |
| | 400 g | Polyurea polyol (petroleum based polyol) |
| | 96 g | Aliphatic amine tetrol (cross-linker; amine salt) |
| | 60 g | Ethylene glycol (cross-linker) |
| | 6 g | Front end catalyst (DABCO 33-LV ®; 33% triethylenediamine and 67% dipropylene glycol) |
| | 3 g | Back end catalyst (tertiary amine catalyst) |
| | 6 g | Blow catalyst (DABCO ® BL-22) |

The A-side was combined with the B-side in a ratio of 50 parts A-side to 100 parts B-side. The resultant foam exhibited good overall properties.

Example 38

The A-side comprises a polymeric MDI, Mondur® MR light. The B-side comprises the following:

| | | |
|---|---|---|
| B-side | 50 g | Soy Oil |
| | 50 g | Sucrose polyol (Bayer 4035) |
| | 10 g | Ethylene glycol (cross-linker) |
| | 2.5 g | Dipropylene glycol (cross-linker) |
| | 3.0 g | Front end catalyst |
| | 2.0 g | Back end catalyst (tertiary block amine catalyst) |

The A-side was mixed with the B-side at the following ratios:

| A-side | B-side |
|---|---|
| 50 | 100 |
| 70 | 100 |
| 80 | 100 |
| 90 | 100 |
| 100 | 100 |

Each mix ratio resulted in a very fast reacting high-density foam exhibiting good qualities overall.

The above description is considered that of the preferred embodiments only. Modifications of the invention will occur to those skilled in the art and to those who make or use the invention. Therefore, is it understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A material comprising the reaction product of an A-side comprising a diisocyanate and a B-side comprising a blown vegetable oil, a cross-linking agent comprised of a multi-functional alcohol and a catalyst, wherein the blown vegetable oil and the cross-linking agent are substantially non-esterified prior to the A-side reacting with the B-side.

2. A method of preparing a material comprising the steps of combining an A-side material comprising a diisocyanate with a B-side material comprising a blown vegetable oil, a cross-linking agent comprised of a multi-functional alcohol and a catalyst, wherein the blown vegetable oil and the cross-linking agent are substantially non-esterified prior to combining the A-side with the B-side.

3. A material comprising the reaction product of an A-side comprising an isocyanate and a B-side comprising a blown vegetable oil, a cross-linking agent comprised of a multi-functional alcohol and a catalyst, wherein the blown vegetable oil and the cross-linking agent are substantially non-esterified prior to the A-side reacting with the B-side.

4. A method of preparing a material comprising the steps of combining an A-side material comprising an isocyanate with a B-side material comprising a blown vegetable oil, a cross-linker comprised of a multi-functional alcohol and a catalyst, wherein the blown vegetable oil and the cross-linking agent are substantially non-esterified prior to combining the A-side with the B-side.

* * * * *